United States Patent
Mueller

(10) Patent No.: US 9,348,203 B2
(45) Date of Patent: May 24, 2016

(54) LIGHTING DEVICE COMPRISING PUMP LIGHT SOURCE, PHOSPHOR ARRANGEMENT AND FILTER ARRANGEMENT

(71) Applicant: Juergen Mueller, Berlin (DE)

(72) Inventor: Juergen Mueller, Berlin (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 14/134,761

(22) Filed: Dec. 19, 2013

(65) Prior Publication Data
US 2014/0176914 A1    Jun. 26, 2014

(30) Foreign Application Priority Data
Dec. 20, 2012   (DE) .......................... 10 2012 223 925

(51) Int. Cl.
| | |
|---|---|
| G03B 21/00 | (2006.01) |
| G03B 21/20 | (2006.01) |
| F21V 9/10 | (2006.01) |
| G02B 26/00 | (2006.01) |
| F21S 10/00 | (2006.01) |
| G03B 33/08 | (2006.01) |

(52) U.S. Cl.
CPC .............. *G03B 21/204* (2013.01); *F21S 10/007* (2013.01); *F21V 9/10* (2013.01); *G02B 26/008* (2013.01); *G03B 33/08* (2013.01)

(58) Field of Classification Search
CPC .... G03B 21/204; G03B 21/2033; F21K 2/00; F21S 10/007
See application file for complete search history.

(56) References Cited

U.S. PATENT DOCUMENTS

| | | | |
|---|---|---|---|
| 6,726,333 B2 | 4/2004 | Huibers et al. | |
| 2012/0242912 A1* | 9/2012 | Kitano | 348/759 |

FOREIGN PATENT DOCUMENTS

| | | |
|---|---|---|
| CN | 102385233 | 3/2012 |
| JP | 2012-212129 | 11/2012 |

* cited by examiner

*Primary Examiner* — Sultan Chowdhury
*Assistant Examiner* — Danell L Owens
(74) *Attorney, Agent, or Firm* — Cozen O'Connor

(57) ABSTRACT

A lighting device (1) comprising a pump light source, wherein the spectral composition of the useful light of the lighting device can be controlled by the control of the phase relationship between a rotating phosphor wheel and a filter wheel rotating synchronously therewith. The control of the phase relationship controls the temporal overlap of the conversion light coming from a phosphor element of the phosphor wheel with a filter element of the filter wheel, i.e. the extent of the spectral filtering of the conversion light by the filter element.

12 Claims, 9 Drawing Sheets

LIGHTING DEVICE COMPRISING PUMP LIGHT SOURCE, PHOSPHOR ARRANGEMENT AND FILTER ARRANGEMENT

FIELD OF THE INVENTION

The invention relates to a lighting device comprising a pump light source, a phosphor arrangement for converting at least part of the pump light into conversion light, and a filter arrangement, for spectrally filtering the conversion light. The invention also relates to a method for operating such a lighting device.

Such a lighting device can be used, in particular, as a light-generating unit in a projector, e.g. for video projectors or data projectors.

BACKGROUND OF THE INVENTION

The prior art discloses lighting devices for projection applications which comprise a phosphor arrangement having one or a plurality of phosphors. In this case, said lighting devices comprise a pump light source, which excites the phosphor to emit light having a different wavelength than the pump light wavelength (wavelength conversion of the pump light by means of phosphor). By means of suitable deflection of the pump light and the light emitted by the phosphor (conversion light), these two light beams can be brought together collinearly and fed to the imaging system.

Laser diodes are preferably used as the pump light source. In this case, the technology is also known by the designation LARP ("Laser Activated Remote Phosphor"). In order to distribute the laser power over a larger area on average over time and thus to reduce thermal quenching of the phosphor, inter alia, the at least one phosphor is usually applied to a wheel that rotates during operation. The lighting device thus emits light as a sequential succession of the spectrally different conversion light and, if appropriate, additionally the pump light, which, given a sufficiently rapid succession, are perceived as mixed light or, in combination with an imaging unit, as a color image.

Projectors are used for various applications that make different requirements of the technical lighting properties of the light from the light-generating unit. The spectral composition of this light determines the color rendering properties thereof and also the color space that can be represented therewith. For data projection, inter alia a bright white background is essential for text or graphical representations, compromises in the color rendering being acceptable. In home cinema applications, by contrast, the best possible color rendering with brilliant colors is sought. Therefore, specific projectors with phosphor wheels and filter wheels adapted to the envisaged (main) application are offered. In this case, the spectrum of the individual light colors of the projector ("color channels") is determined and defined by the spectral properties of phosphor wheel and filter wheel rotating synchronously therewith. The luminous flux proportions of the color channels are defined by the segmentation of the different phosphors on the phosphor wheel and filter segments on the filter wheel. It is not possible to change the spectral properties of the projector during operation. Adaptation is generally possible only by exchanging the phosphor wheel and/or filter wheel. In this regard, projectors for home cinema applications require a larger red phosphor segment and/or additionally filtering in the direction of deep red. By contrast, larger green phosphor and yellow phosphor segments are customary for data projection.

The document CN 102385233 A discloses a lighting device for a projector comprising a pump laser, a phosphor wheel for the wavelength conversion of the pump laser light into conversion light, and a filter wheel, for spectrally filtering the conversion light. The pump laser light is directed onto the phosphor wheel with the aid of a dichroic mirror. The conversion light reflected back from the phosphor wheel passes through the dichroic mirror and impinges on the filter wheel. The pump laser light can pass through a transparency segment in the phosphor wheel and is fed to the dichroic mirror via a wraparound loop. The dichroic mirror reflects the pump laser light to the filter wheel. The filter wheel and the phosphor wheel are arranged on a common axis and thus rotate at the same speed.

SUMMARY OF THE INVENTION

One object of the present invention is to specify a lighting device, in particular a lighting device for projection applications, which makes it possible to change the technical lighting properties, in particular the luminous flux and the spectral composition of the light, during operation.

This and other objects are attained in accordance with one aspect of the present invention directed to a lighting device, comprising a pump light source, a phosphor arrangement, wherein the phosphor arrangement has at least one phosphor element which can be irradiated with the pump light of the pump light source and re-emits said pump light at least partly in a wavelength-converted manner, and wherein the phosphor arrangement is arranged in a moveable manner in a beam path of the pump light source, a filter arrangement, wherein the filter arrangement has at least one filter element which can be irradiated with the wavelength-converted light, and wherein the filter arrangement is arranged in a moveable manner in a beam path of the wavelength-converted light, a movement unit which is designed to move the phosphor arrangement and the filter arrangement with a fixed phase relationship between the at least one phosphor element and the at least one filter element, and a phase control unit for controlling the phase relationship between the at least one moving phosphor element and the at least one moving filter element.

The features described below for the lighting device according to an embodiment of the invention and for the possibilities for configuration thereof and the advantages of said features also hold true, insofar as applicable in an analogous manner for the method according to an embodiment of the invention, and vice versa.

The described embodiment of the invention utilizes the phase relationship between the moving phosphor arrangement, for example a rotating phosphor wheel, and the filter arrangement moving synchronously therewith (i.e. with a temporally constant phase relationship), for example a rotating filter wheel, for the desired change in the technical lighting properties, in particular the spectral composition of the light of the lighting device. By changing the phase relationship between phosphor wheel and filter wheel, it is possible according to the invention to control the spectrum and/or the proportion or the power of the respective conversion light colors.

Controlling the phase relationship comprises, in particular, changing a temporal overlap between the at least one moving phosphor element and the filter element moving synchronously therewith. In this case, changing the phase relationship can also consist in the fact that after the change a temporal overlap between phosphor element and filter element is only then present at all or a temporal overlap between phosphor element and filter element is no longer present. During the temporal overlap between a phosphor element and filter element, the light emitted by the phosphor can pass through said filter element and is thus correspondingly spectrally filtered.

It has been found that a new phase relationship between phosphor wheel and filter wheel can be established within approximately two seconds with the aid of a suitable movement and phase control unit. It is thus possible to set the brightness and the representable color space of a projector as necessary to comply with the respective representation situation, for example by means of an operating menu available for the user. The quality and quantity of the possible changes of brightness and representable color space can be configured by means of the phase change and the specific configuration of phosphor wheel and filter wheel.

For this purpose, the at least one filter element can be designed as a long-pass filter, short-pass filter, bandpass filter or band-stop filter. The aforementioned filters can also be provided in combination, that is to say that the filter arrangement then has more than one filter element, for example two or three. In this case, two spatially separate filter elements can also be designed as filters of the same type. Moreover, the filter arrangement can have a transparency element, which is transparent to the pump light and the wavelength-converted light (conversion light). Therefore, at least for the pump light and conversion light or else for the entire visible spectrum, the transparency element does not have spectral filter properties, but rather has a uniformly high transmittance, preferably close to 100%.

In principle, different embodiments and forms of movement are suitable for the filter arrangement and the phosphor arrangement. What is crucial is that the movements of filter element and phosphor element can be synchronized and the phase relationship of both elements can be controlled.

The filter arrangement and the phosphor arrangement can be designed for a linear movement, for example. For this purpose, the filter element and phosphor element respectively can e.g. be arranged in each case on a slide that is moveable transversally with respect to the impinging light beam.

The phosphor arrangement and filter arrangement can also be designed for a rotating movement.

By way of example, the phosphor arrangement and filter arrangement can be embodied in each case as a roll. The phosphor and respectively filter elements are in this case arranged on the lateral surface of the corresponding roll.

Preferably the phosphor arrangement and filter arrangement are configured as a phosphor wheel and filter wheel, respectively. The at least one phosphor element and the at least one filter element can then be embodied as a circle-sector-shaped or annular phosphor segment and filter segment, respectively. The phase relationship between phosphor wheel and filter wheel can then be related for example—as viewed in the direction of rotation of the wheels—to the start of the phosphor segment and filter segment, respectively. In other words, if the start of the phosphor segment and the start of the filter segment simultaneously rotate through the respectively impinging pump light beam and conversion light beam, then phase difference is zero (maximum temporal overlap between phosphor segment and filter segment, i.e. maximum spectral filtering). By contrast, if the filter segment starts to rotate through the conversion light beam only when the phosphor segment is already completely through the pump light beam, then the phase difference is maximal (no temporal overlap between phosphor segment and filter segment, i.e. no spectral filtering). It goes without saying that any desired intermediate values can be set as necessary for the phase relationship, in accordance with the desired filter effect. Moreover, the phase relationship between phosphor wheel and filter wheel can also be defined and dimensioned differently. That holds true particularly when a plurality of phosphor and/or filter segments are provided. The at least one filter segment can cover an angular range which is equal in magnitude to the angular range covered by the at least one phosphor segment. Given a suitable phase relationship between filter segment and phosphor segment, the filter segment phase temporally overlaps the phosphor segment phase, i.e. while the pump light impinges on the phosphor segment of the phosphor wheel and is converted, this conversion light impinges on the synchronously moving filter segment of the filter wheel.

Moreover, a further phosphor segment can be provided, the angular range of which is equal in magnitude to or greater than that of the at least one filter segment and/or of a further filter segment.

The conversion of the pump light into conversion light preferably takes place from a shorter wavelength to a longer wavelength ("Down Conversion"), since this does not require additional energy. In this case, therefore, the wavelength of the pump light is shorter than the wavelengths of the conversion light. For this purpose, the pump light of the pump light source can comprise a blue laser radiation and/or blue-violet and/or ultraviolet laser radiation.

A blue laser radiation as pump light has the advantage that a portion unconverted can be concomitantly used as blue light.

The phosphor arrangement preferably comprises at least one phosphor having a dominant wavelength in the green and/or red and/or yellow and/or blue wavelength range.

The dominant wavelength of light having a light color (colored light) is defined in the CIE chromaticity diagram (standard chromaticity diagram, by the point of intersection between the straight line, extended from the white point via the determined color locus of the colored light, and the spectrum locus of the closest edge of the CIE chromaticity diagram. By way of example, efficient red phosphors have a dominant wavelength of approximately 600 nm.

A phosphor can be understood to mean any, in particular solid, substance which enables wavelength conversion. The wavelength conversion can be based on a fluorescence or phosphorescence, for example.

The method according to the invention for operating a lighting device explained above preferably comprises at least two different selectable operating modes A and B, comprising the following method steps:

operating mode A: setting a first phase relationship between the at least one moving phosphor element and the at least one filter element moving synchronously with the phosphor element with the aid of the phase control unit;

operating mode B: setting a second phase relationship between the at least one moving phosphor element and the at least one filter element moving synchronously with the phosphor element with the aid of the phase control unit, wherein the second phase relationship differs from the first phase relationship.

The first phase relationship corresponds to a first temporal overlap and the second phase relationship corresponds to a different or no temporal overlap between the at least one moving phosphor element and the at least one filter element moving synchronously with the phosphor element.

Operating mode A can be provided for example for data projection, and operating mode B for home cinema projection, or vice versa.

The control between different operating modes can be performed in one step or else incrementally or else in a continuously progressing transition.

Moreover, the control between different operating modes can also be initiated by the image information supplied by an image generating unit of a projector, or by some other signal.

Further advantages, features and details of the invention are evident from the claims, the following description of preferred embodiments and with reference to the drawings.

DETAILED DESCRIPTION OF THE DRAWINGS

Features that are identical or of identical type may also be designated by identical reference signs hereinafter, for the sake of simplicity.

Figure 1:
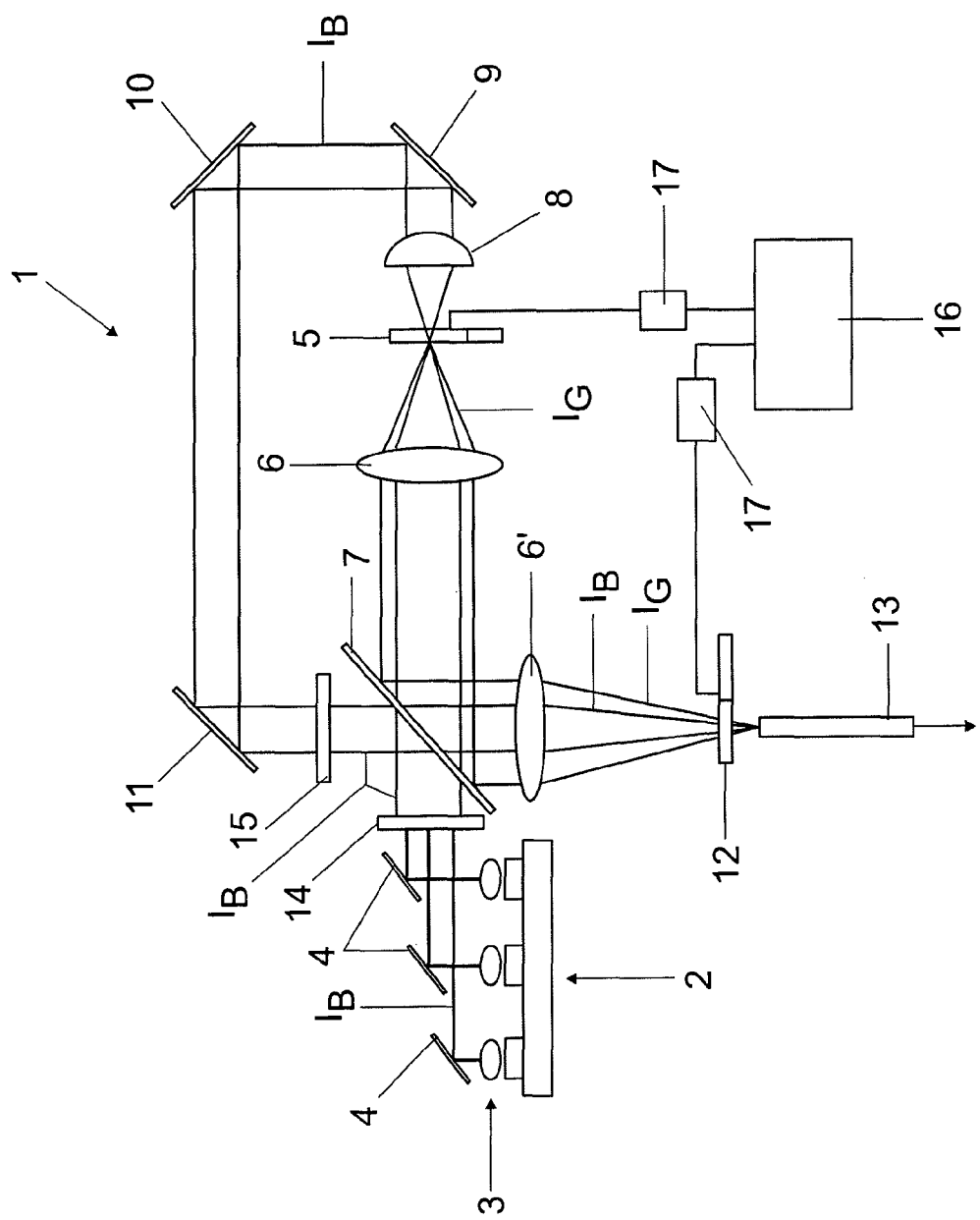
FIG. 1 shows an exemplary embodiment of a lighting device according to the invention comprising a phosphor wheel and a filter wheel.

FIG. 1 shows a schematic illustration of a lighting device 1 in accordance with one exemplary embodiment of the invention.

The lighting device 1 comprises a pump light source 2, which is embodied as a laser diode matrix and which comprises a plurality of laser diodes 3 (here in each case including primary lens). The pump light source 2 is designed to emit light in the blue spectral range since, firstly, this constitutes a suitable excitation wavelength for most phosphors. Secondly, this makes it possible to utilize the unconverted blue laser light as a blue light channel (B), for example of an RGB projection unit. Therefore, the laser diodes 3 in this exemplary embodiment are chosen such that they emit pump light in the form of blue laser radiation $I_B$ having an emission wavelength of e.g. approximately 400-470 nm.

Via deflection mirrors 4 assigned to the laser diodes 3, the blue laser light of said laser diodes 3 is directed onto a phosphor arrangement embodied as a phosphor wheel 5, where it is converted into light having a different dominant wavelength, for example into light $I_g$ in the green spectral range. For this purpose, the phosphor wheel 5 comprises one or a plurality of different phosphors which are arranged in annular segments of the phosphor wheel 5 and can be temporally sequentially irradiated by the pump light $I_B$ by means of the rotation of the phosphor wheel 5 and can be excited by emitting wavelength-converted light. The blue pump light $I_B$ emitted by the laser matrix 2 is focused onto the phosphor segments of the rotating phosphor wheel 5 with the aid of an optical unit 6. The wavelength-converted light reflected back from the phosphor segment rotating past below the pump light spot is collimated by said optical unit 6 and coupled out via a dichroic mirror 7 by means of reflection. For this purpose, the dichroic mirror 7 is arranged between the pump light source 2 and the phosphor wheel 5 in a tilting position of 45° with respect to the beam path. Moreover, the dichroic mirror 7 is designed to transmit light in the blue spectral range and to reflect light in the non-blue spectral range. As a result, on the one hand, the blue pump light $I_B$ can pass through the dichroic mirror 7 onto the phosphor wheel 5; on the other hand, the dichroic mirror 7 couples the wavelength-converted light, that is to say for example green light $I_G$, out of the pump light beam path perpendicularly. The dichroic mirror 7 therefore serves here as a wavelength-selective beam splitter.

Moreover, the phosphor wheel 5 has a region that is transparent to the blue pump light $I_B$, for example a material-free opening through which the blue pump light. $I_B$ can pass through the phosphor wheel 5 without interaction therewith. Alternatively, the opening can also be filled with a transparent material. The transmitted blue pump light $I_B$, which is collimated by a further optical unit 8, is deflected via three deflection mirrors 9, 10, 11 into a so-called "wraparound" branch and guided back to the dichroic mirror 7.

The unconverted blue pump light beam $I_B$ coming from the "wraparound" branch passes through the dichroic mirror 7. By contrast, the converted (=wavelength-converted) light beam $I_G$ impinging temporally sequentially on the other side of the dichroic mirror 7 is reflected by the dichroic mirror 7. Since the pump light beam $I_B$ and the conversion light beam $I_G$ impinge on the two opposite sides of the dichroic mirror 7 perpendicularly to one another and respectively at 45°, ultimately the two beam paths are brought together collinearly and focused via a further focusing lens system 6' onto a filter wheel 12 in this way. After passing through the filter wheel 12, the pump light $I_B$ and conversion light $I_G$ pass for spatial superimposition (intermixing) for example into an integrator 13 of a projection module. The filter wheel 12 has at least one filter segment in order to spectrally narrow or vary the generally very wide spectrum of the light wavelength-converted by a phosphor (conversion light) and thus e.g. to optimize the color space for the respective projection application.

A homogenizer 14 is also disposed downstream of the laser diode matrix 2 in order to obtain an as uniform as possible power density distribution of the blue laser radiation b on the phosphor of the phosphor wheel 5. So-called quenching is thereby intended to be avoided or minimized as much as possible. Quenching is a reduction of the conversion efficiency of the phosphor on account of increased power density (intensity quenching) and/or increased temperature (thermal quenching). A plateau-shaped power density distribution of the pump light on the phosphor would be ideal.

Furthermore, a second homogenizer 15 is provided between the third deflection mirror 11 and the dichroic mirror 7 in order that the blue pump light $I_B$ that passed through phosphor wheel without being converted is further homogenized before combination with the conversion light $I_G$ or in order to reduce speckle patterns that possibly occur in the application. The homogenizers can also contain optical elements for beam shaping.

The phosphor wheel 5 and the filter wheel 12 are driven synchronously by means of a phase control unit 16, i.e. with a fixed phase relationship, wherein the phase difference between phosphor wheel 5 and filter wheel 12 is adjustable. Both the phosphor wheel 5 and the filter wheel 12 are caused to rotate synchronously by means of a two-part drive unit 17, that is to say with the same rotational speed.

In a variant (not illustrated) of the lighting device illustrated in FIG. 1, the wraparound loop can also be dispensed with if the blue light component, like the other colored light components as well, is generated by means of phosphor conversion. In this case, the phosphor wheel has a blue phosphor segment instead of the region that is transparent to the pump light. The blue light generated by the blue phosphor upon irradiation with pump light and the other colored light components generated temporally sequentially by the other phosphor segments are coupled out toward the filter wheel by the dichroic mirror. The optical elements required only for the wraparound loop are thus superfluous, namely the collimation optical unit 8 arranged downstream of the phosphor wheel 5 in FIG. 1, the three downstream 45° deflection mirrors 9-11 and, finally, the second homogenizer 15. Moreover, if necessary, the wavelength of the laser diodes of the diode matrix 2 should be suitably adapted for the excitation of the blue phosphor. By way of example, a blue-violet laser wavelength is suitable. The coatings of the dichroic mirror should likewise be correspondingly adapted, namely such that the wide-band blue conversion light is also reflected and only the narrow-band blue-violet laser light is transmitted.

Referring to FIGS. 2 to 5, an explanation is given below of various embodiments of the phosphor wheel 5 and the filter wheel 12 and, for example, the effect of different phase differences between phosphor wheel 5 and filter wheel 12 on the spectral composition of the resulting useful light. In this case, for the sake of better clarity, the phosphor wheel 5 is illustrated within the filter wheel 12, to be precise with the phase difference respectively set with the aid of the phase control unit 16. As a result, it can easily be recognized at what location or at what time on the filter wheel 12 there impinges a light beam reflected back from a location on the phosphor wheel 5 and converted by the corresponding phosphor and an unconverted light beam via the wraparound loop. FIGS. 2a, 2b depict for elucidation purposes by way of example the blue pump light spot $I_B$ on the phosphor wheel 5 and the conversion light spot $I_R$ on the filter wheel 12. In this respect, the schematic illustrations do not necessarily correspond to the actual size relationships, but rather serve primarily for the simple elucidation of the respective phase relationship between phosphor wheel 5 and filter wheel 12. For the sake of simplicity, identical angular velocities of phosphor wheel and filter wheel are also assumed, such that identical angular ranges correspond to identical irradiation durations of the irradiated regions of phosphor wheel and filter wheel. The considerations below apply to a lighting device according to the invention both with and without a wraparound loop.

Figure 2A:
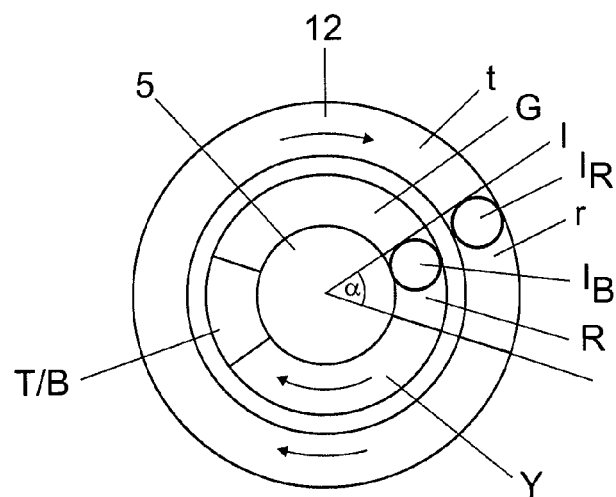
FIG. 2a shows a first embodiment of the phosphor wheel and filter wheel in accordance with the lighting device from FIG. 1 with a first phase difference.

FIG. 2a shows in schematic illustration a first embodiment of the phosphor wheel 5 and the filter wheel 12 in the lighting device 1 in accordance with FIG. 1. The phosphor wheel 5 has four annular segments, which are coated in this order with a green phosphor G, a red phosphor R and a yellow phosphor Y. The fourth segment T/B is either transparent T, that is to say allows the blue pump light $I_B$ for the wraparound loop to pass through without being obstructed, or coated with a blue phosphor B (variant without wraparound loop). The filter wheel 12 has two annular segments, a long-pass filter segment r and a transparency segment t. With regard to the filter effect of the long-pass filter r, reference is made to FIG. 7 and the associated description. The respective temporal length (=angular range α of the associated circle sector) of the red phosphor segment R and of the long-pass filter segment r are co-ordinated here with one another such that they correspond to the same time duration for the light beam sweeping over them (=identical angular range for identical angular velocity of phosphor wheel and filter wheel). Moreover, the phases are co-ordinated with one another with the aid of the phase control unit 16 (cf. FIG. 1) such that while the pump light beam $I_B$ sweeps over the red phosphor segment R, the short-wave component of the red conversion light $I_R$ reflected back is simultaneously filtered out by the long-pass filter segment r. The phase difference between the red phosphor segment R and the long-pass filter segment r is therefore zero in this example. As a result, the dominant wavelength shifts in the direction of longer-wave red. In the case of this phase synchronization, therefore, the long-pass filter segment r of the filter wheel 12 acts as a long-pass filter for the red light converted by the red phosphor segment R. The red phosphor segment R is therefore completely covered by the long-pass filter segment r of the filter wheel 12. The remaining light colors, that is to say the unconverted (with wraparound loop), and converted (without wraparound loop) blue light and the yellow and green light respectively converted by the yellow phosphor segment Y and green phosphor segment G, pass through the transparency segment t of the filter wheel 12, that is to say remain spectrally unfiltered. With this setting of the phases of phosphor wheel 5 and filter wheel 12 (namely in phase, i.e. the phase difference between red phosphor segment R and long-pass filter segment r is zero) therefore, the red component is reduced (since only the long-wave component can pass through the long-pass filter), but otherwise the integral luminous flux remains maximal.

Figure 2B:
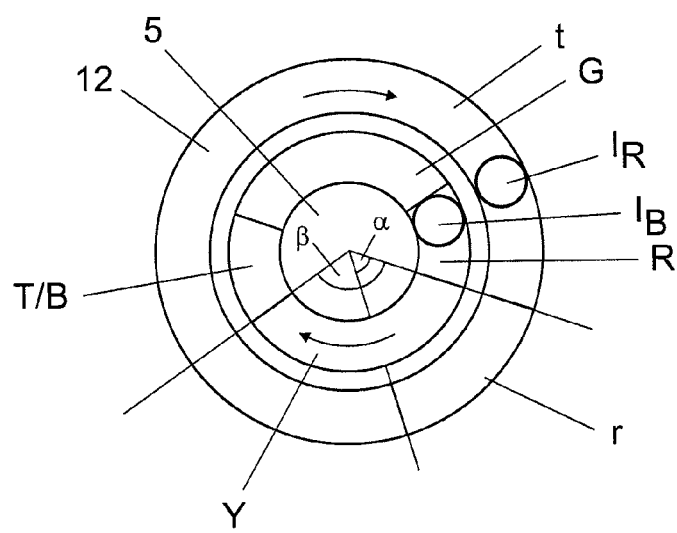
FIG. 2b is the same as FIG. 2a, but with a second phase difference.

FIG. 2b illustrates a changed phase relationship compared with FIG. 2a. Here the red light $I_R$ coming from the red phosphor segment R of the phosphor wheel 5 passes through the transparency segment t of the filter wheel 12, that is to say remains spectrally unfiltered. Rather, the long-pass filter segment r begins with the yellow phosphor segment Y directly following the red phosphor segment R and therefore filters out the short-wave part of the yellow light. However, since the yellow phosphor segment Y is temporally longer than the long-pass filter segment r (angular range β of the circle sector associated with the yellow phosphor segment Y is larger than the angular range α), only part of the yellow light phase is filtered. With this setting of the phases of red phosphor segment R and long-pass filter segment r (namely phase-shifted here in the direction of rotation such that red phosphor segment R and long-pass filter segment r do not overlap), the integral luminous flux is reduced compared with the phase setting illustrated in FIG. 2a. However, the red component is higher. The remaining light colors, that is to say the unconverted (with wraparound loop) and converted (without wraparound loop) blue light and the green light converted by the green phosphor segment G, pass through the transparency segment t, that is to say remains spectrally unfiltered in the same way as the red light.

Figure 3A:
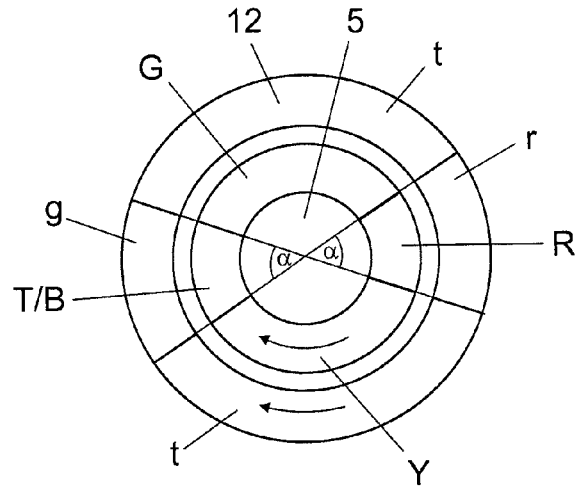
FIG. 3a shows a second embodiment of a filter wheel in a first phase relationship with the phosphor wheel in accordance with FIGS. 2a-b.
Figure 3B:
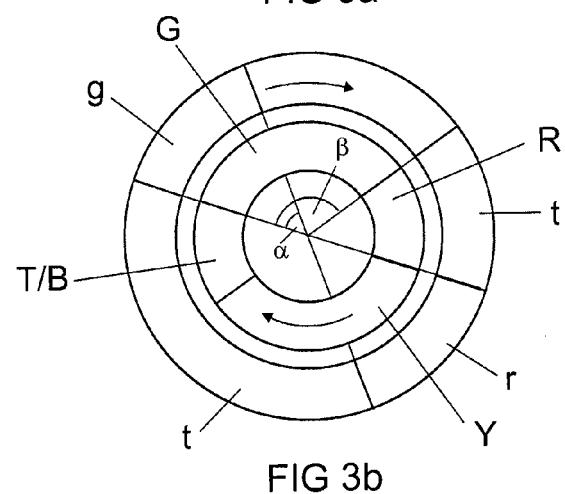
FIG. 3b is the same as FIG. 3a, but with a second phase difference.
Figure 3C:
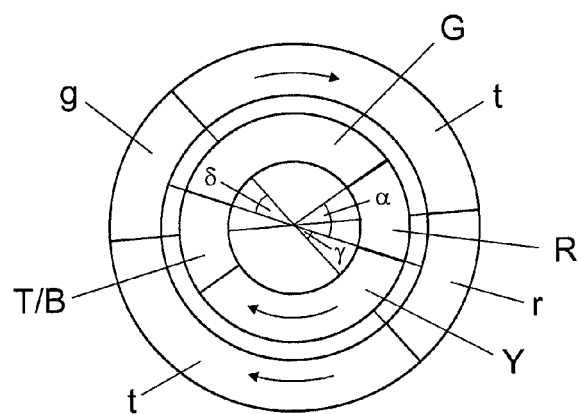
FIG. 3c is the same as FIG. 3a, but with a third phase difference.

In the case of the configuration illustrated schematically in FIGS. 3a to 3c, the phosphor wheel 5 is unchanged. On the filter wheel 12, however, a short-pass filter segment g is also arranged opposite the long-pass filter segment r. With regard to the filter effect of the short-pass filter g, reference is made to FIG. 8 and the associated description.

The phase relationship illustrated in FIG. 3a substantially corresponds to that from FIG. 2a, that is to say that the phase difference between the red phosphor segment R and the long-pass filter segment r is zero. The short-pass filter segment g simultaneously covers the same angular range a as the transparency region T/A of the phosphor wheel 5 (corresponds to the blue light segment). Since the short-pass filter segment g allows the short-wave blue light to pass through without being obstructed, the blue light remains spectrally unfiltered. The overall effect therefore corresponds to that from FIG. 2a.

The setting of the phases of the phosphor wheel 5 and of the filter wheel 12 as shown in FIG. 3b corresponds to the setting shown in FIG. 2b for the red region. The effect with regard to the red phosphor segment R and the long-pass filter segment r is therefore likewise identical. In addition, however, the long-wave part of the green light is filtered away by the short-pass filter segment g during part of the green light phase (corresponding to the angular range $\alpha$). As a result, the dominant wavelength of the green conversion light becomes shorter-wave. During the remaining duration of the green light phase (corresponds to the angular range $\beta$ minus $\alpha$), the green light passes through the transparency region t of the filter wheel 12, that is to say remains unfiltered. The overall effect gives rise integrally to a—compared with FIG. 3a—lower luminous flux with filtered green component but more red component.

FIG. 3c, finally, illustrates a setting for which the phase difference between the red phosphor segment R and the long-pass filter segment r corresponds to a centre setting between the settings shown in FIGS. 3a and 3b, respectively. The temporal overlap of red phosphor segment R and long-pass filter segment r corresponds to the angular range $\gamma$ of the overlapping circle sector. This overlapping angular range $\gamma$ is smaller than the total angular range a of the circle sector corresponding to the red phosphor segment R or the long-pass filter segment r. The remainder $\alpha$ minus $\gamma$ of the total angular range a of the long-pass filter segment r overlaps the corresponding part of the yellow phosphor segment Y. Such an intermediate setting can, of course, also be set in the case of the variant with only one filter segment as illustrated in FIG. 2a, b. The short-pass filter segment g overlaps the green phosphor segment G in the angular range $\delta$. The remainder $\alpha$ minus $\delta$ of the total angular range $\alpha$ of the short-pass filter segment g overlaps the corresponding part of the blue light segment T/B. The overall effect gives rise integrally to a luminous flux with red, yellow and green components filtered at times.

Figure 4A:
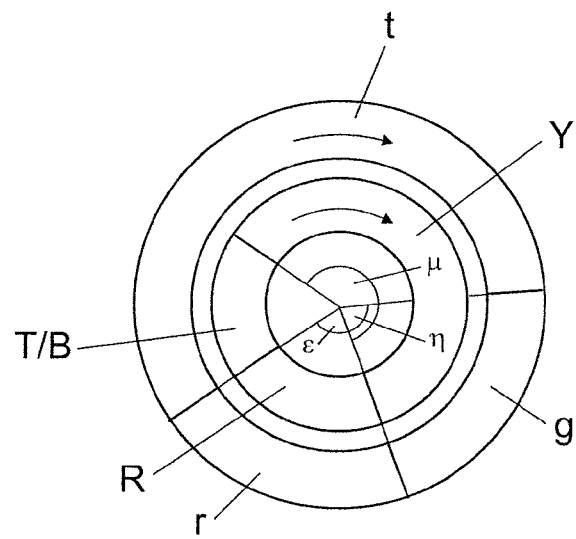
FIG. 4a shows a third embodiment of a phosphor wheel and a filter wheel in a first phase relationship.
Figure 4B:
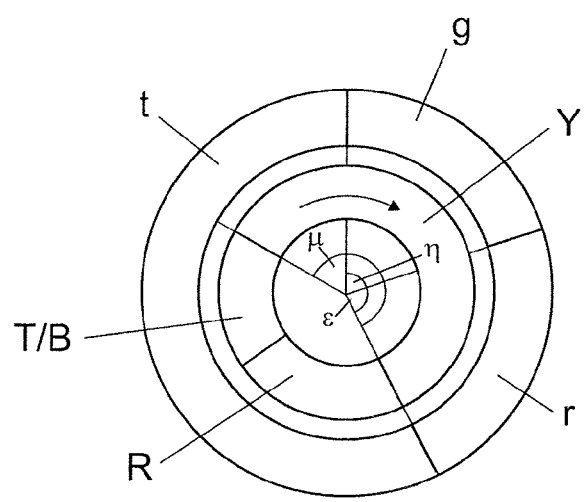
FIG. 4b is the same as FIG. 4a, but with a second phase relationship.

In the configuration illustrated schematically in FIGS. 4a and 4b, in a manner similar to that in FIGS. 3a-c the filter wheel 12 has, in addition to a transparency segment t both a long-pass filter segment r and a short-pass filter segment g. However, the two filter segments r and g are not arranged opposite one another but rather alongside one another. The phosphor wheel 5 has only a red phosphor segment R, a yellow phosphor segment Y and a transparent blue light or blue phosphor segment T/B.

FIG. 4a illustrates a phase relationship in which the red phosphor segment R and the long-pass filter segment r, which both occupy the same angular range $\epsilon$, completely overlap temporally. The directly following short-pass filter segment g, which occupies the angular range $\eta$ overlaps part of the yellow phosphor segment Y, which occupies the major azimuthal proportion of the phosphor wheel 5 (angular range $\mu$ greater $\epsilon$ plus $\eta$). The remainder of the yellow phosphor segment Y and the blue light or blue phosphor segment T/B impinge on the transparency segment t of the filter wheel 12, that is to say do not experience spectral filtering. In this setting, the overall effect results integrally in a maximum luminous flux with reduced red component and yellow component filtered at times.

In the case of the phase relationship shown in FIG. 4b, the long-pass filter segment r begins only after the end of the red phosphor segment R, i.e. the red component remains unfiltered. In return, the long-pass filter segment r overlaps part of the yellow phosphor segment Y. The directly following short-pass filter segment g likewise overlaps part of the yellow phosphor segment Y. A respective part of the yellow luminous flux is therefore filtered by the long-pass filter segment r and short-pass filter segment g. In this setting, compared with the setting shown in FIG. 4a, the overall effect results integrally in a reduced luminous flux, but with a greater red component of the emitted light.

Figure 5A:
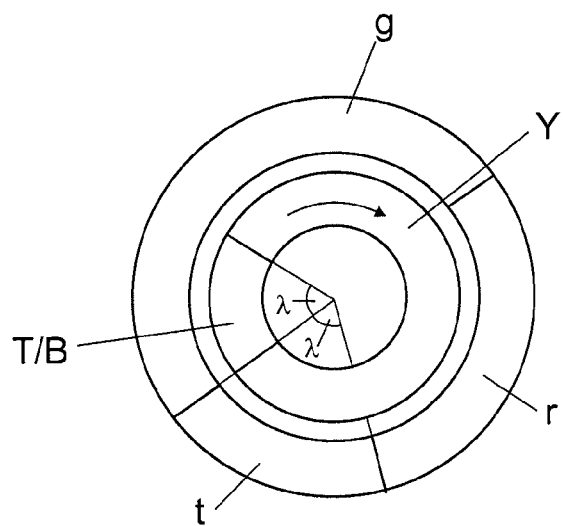
FIG. 5a shows a fourth embodiment of a phosphor wheel and a filter wheel in a first phase relationship.
Figure 5B:
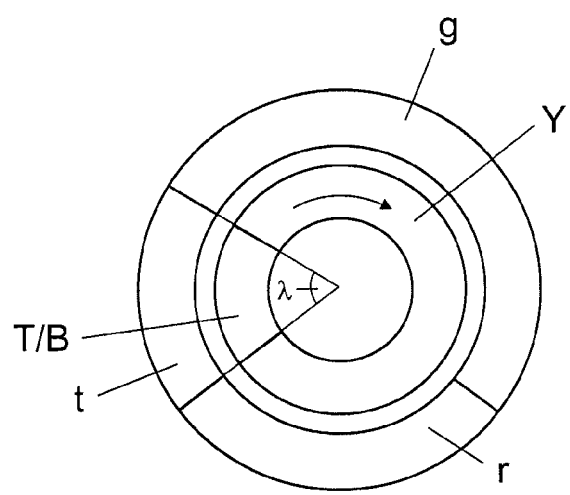
FIG. 5b is the same as FIG. 5a, but with a second phase relationship.

In the configuration illustrated schematically in FIGS. 5a and 5b, the filter wheel 12 corresponds, in principle, to that shown in FIGS. 4a-b. However, here the short-pass filter segment g extends over half of the filter wheel 12, that is to say that the associated angular range is 180°. The adjoining long-pass filter segment r is dimensioned such that the remaining transparency segment t of the filter wheel 12 covers the same angular range $\lambda$ as the blue light or blue phosphor segment T/B of the phosphor wheel 5. The remainder of the phosphor wheel 5 i.e. the angular range 360° minus $\lambda$ is covered by a yellow phosphor segment Y. A BY phosphor wheel is therefore involved here.

In the case of the phase relationship shown in FIG. 5a, the short-pass filter segment g begins with the blue light or blue phosphor segment T/B of the phosphor wheel 5 and extends over a first part of the yellow phosphor segment Y. the remaining 180° angular range of the yellow phosphor segment Y is overlapped by the long-pass filter segment r apart from the angular range $\lambda$. In other words, only the angular range $\lambda$ of the yellow phosphor segment Y remains spectrally unfiltered. The short-wave blue light impinging on the short-pass filter segment g during the blue light segment T/B likewise passes through the short-pass filter in a spectrally unfiltered manner. In this setting, the overall effect results integrally in a maximum luminous flux with a yellow component filtered at times by the short-pass filter segment g and long-pass filter segment r.

In the case of the phase relationship shown in FIG. 5b, the blue light or blue phosphor segment T/B of the phosphor wheel 5 and the transparency segment t—covering the same angular range $\lambda$—of the filter wheel 12 completely overlap. As a result, the yellow phosphor segment Y over its total angular range (360° minus $\lambda$) also overlaps the short-pass filter segment g and the directly following long-pass filter segment r. Therefore, the overall effect results integrally in a lower luminous flux than in the case of the setting shown in FIG. 5a, but with more green component.

Figure 6A:
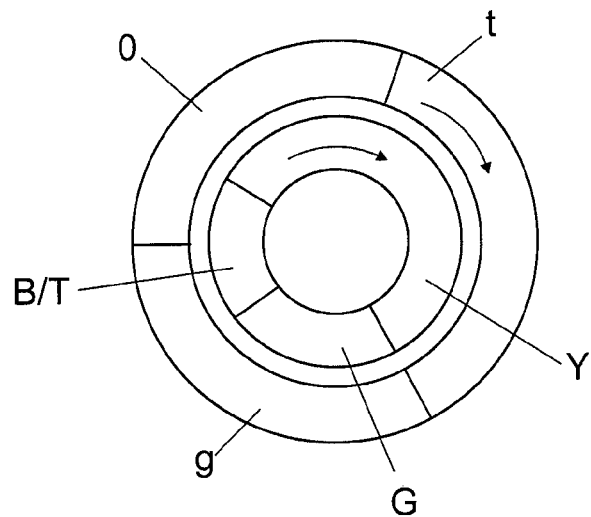
FIG. 6a shows a fifth embodiment of a phosphor wheel and a filter wheel in a first phase relationship.
Figure 6B:
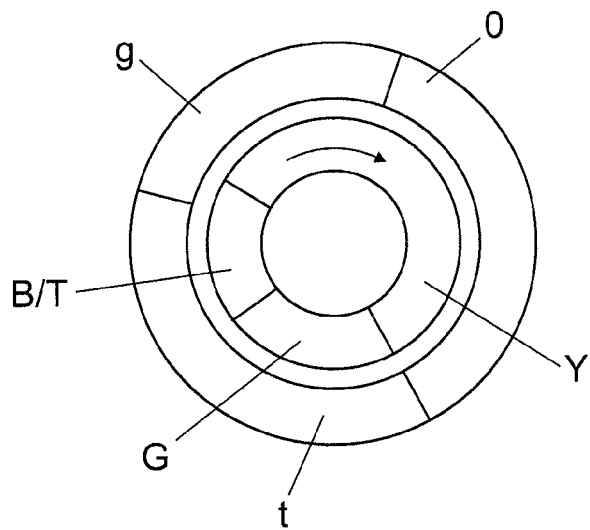
FIG. 6b is the same as FIG. 6a, but with a second phase relationship.

In the configuration illustrated schematically in FIGS. 6a and 6b, the filter wheel 12 has a transparency segment t, a short-pass filter segment g and a band-stop filter o. With regard to the filter effect of the band-stop filter o, reference is made to FIG. 9 and the associated description. The phosphor wheel 5 additionally has a green phosphor segment G compared with the phosphor wheel shown in FIG. 5a, b. A BYG phosphor wheel is therefore involved.

In the case of the phase relationship shown in FIG. 6a, the short-pass filter segment g completely overlaps the green phosphor segment G and partly overlaps the blue light or blue phosphor segment T/B. The entire green light phase is therefore filtered. The short-wave blue light can pass through both the short-pass filter and the band-stop filter, that is to say remains spectrally unfiltered. Part of the following yellow light phase is filtered by the band-stop filter. The remainder of the yellow light phase remains spectrally unfiltered by virtue of the following transparency segment t of the filter wheel. Overall, the result in this position is a maximum luminous flux with a great yellow component.

In the case of the phase relationship shown in FIG. 6b, the yellow phosphor segment Y completely overlaps the band-stop filter o and the major proportion of the short-pass filter g, that is to say that the yellow light phase is completely filtered. The transparency segment t completely overlaps the green phosphor segment G and the major proportion of the blue light or blue phosphor segment T/B, that is to say that both the green light phase and the blue light phase remain spectrally unfiltered. Overall, in this position the result is a lower luminous flux compared with FIG. 6a, without a yellow component, but in return with more red and green.

Figure 7:
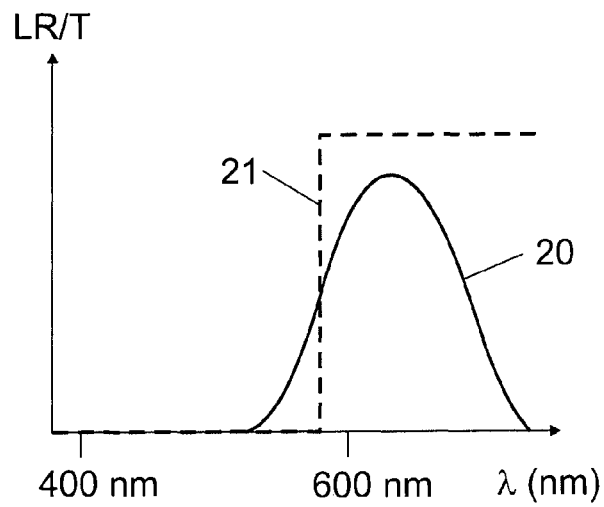
FIG. 7 shows a schematic profile of the emission curve of a red phosphor and the filter curve of a long-pass filter.

FIG. 7 schematically shows the emission curve 20 of a red phosphor and an idealized filter curve 21 of a long-pass filter. For this purpose, on the Y-axis the light power $L_R$ emitted by a red phosphor is plotted schematically against the wavelength $\lambda$. For the filter curve 21, the idealized transmission T is plotted as a function of the wavelength $\lambda$. In this exemplary example it can be seen that the long-pass filter blocks the short-wave part of the emission spectrum 20 of the red phosphor and transmits only the longer-wave part. In this case, real filters do not, of course, have an idealized staircase function. This also applies to the following examples in FIGS. 8-9.

Figure 8:
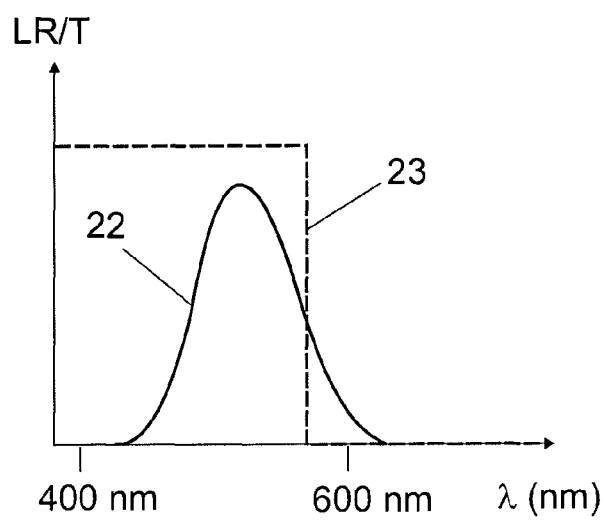
FIG. 8 shows a schematic profile of the emission curve of a green phosphor and the filter curve of a short-pass filter.

FIG. 8 schematically shows the emission curve 22 of a green phosphor and the filter curve 23 of a long-pass filter. It can be seen here that the short-pass filter blocks the long-wave part of the emission spectrum 22 of the red phosphor and transmits only the shorter-wave part.

Figure 9:
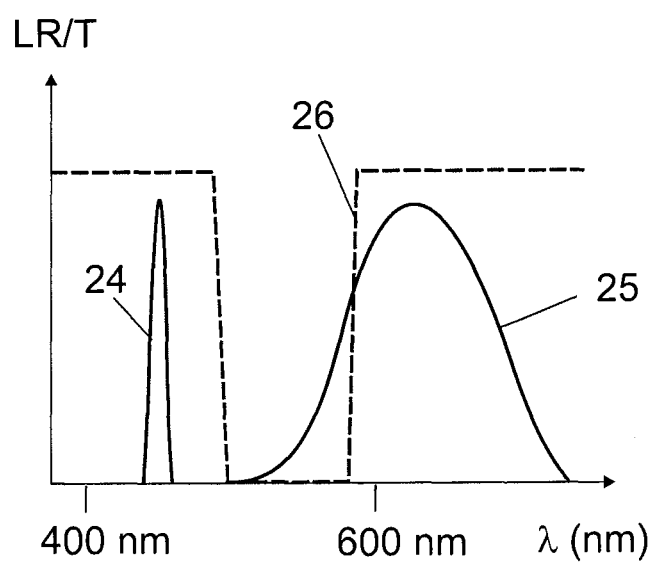
FIG. 9 shows the schematic profile of the emission curves of a laser diode and of a red phosphor and the filter curve of a band-stop filter.

FIG. 9 schematically shows the emission curves 24, 25 of a blue laser diode and of a red phosphor, respectively, and the filter curve 26 of a band-stop filter. It can be seen here that the band-stop filter transmits the short-wave blue laser light 24 and longer-wave part of the emission spectrum 25 of the red phosphor and blocks only a narrow wavelength range that substantially coincides with the shorter-wave part of the emission spectrum 25 of the red phosphor.

Figure 10:
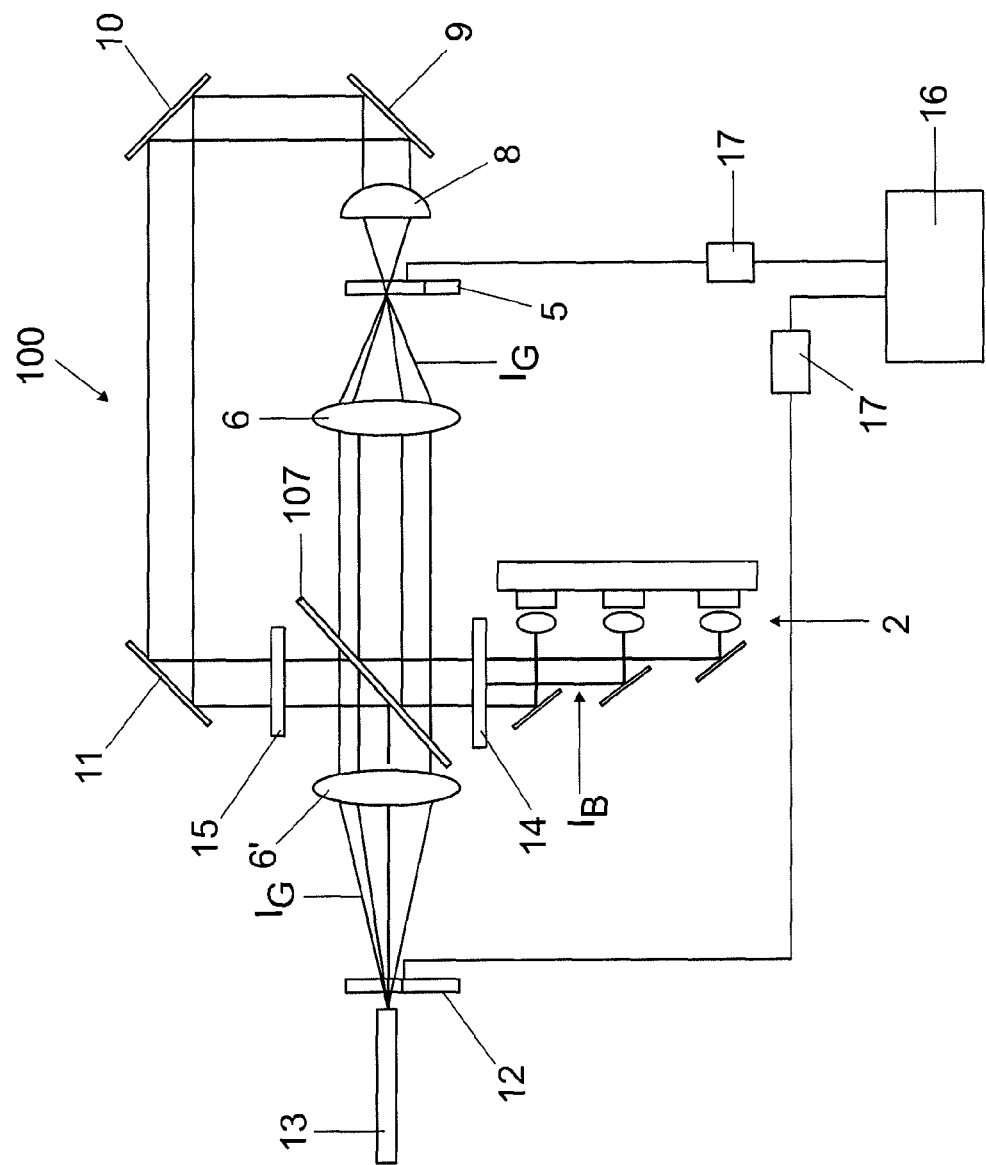
FIG. 10 shows a further exemplary embodiment of a lighting device according to the invention comprising a phosphor wheel and a filter wheel.

FIG. 10 shows a schematic illustration of a variant 100 of the exemplary embodiment of the lighting device according to the invention as illustrated in FIG. 1. This variant differs from the exemplary embodiment illustrated in FIG. 1 substantially in that the position of pump light source 2 (laser diode matrix including deflection mirror and first homogenizer) and filter wheel 12 (including focusing lens system 6' and optical integrator 13) are interchanged. Moreover, the coating of the dichroic mirror 107 is correspondingly adapted, namely reflective to the blue laser radiation $I_B$ and transparent to the conversion light, for example the green light $I_G$. The blue laser light $I_B$ is thus reflected by the dichroic mirror 107 onto the phosphor wheel 5. The conversion light $I_G$ coming from there passes through the dichroic mirror 107 and is focused onto the filter wheel 12 with the aid of the focusing lens system 6'. The blue laser light $I_B$ coming from the wraparound loop is focused by the dichroic mirror 107 onto the filter wheel 12. Following the filter wheel 12, the respective colored light components pass temporally sequentially into the optical integrator 13 or some other optical system. The remaining elements and the arrangement thereof in the lighting device 100 shown in FIG. 10 do not differ from the lighting device 1 shown in FIG. 1. In particular, the phase control between phosphor wheel 5 and filter wheel 12 by means of the phase control unit 16 is also unchanged. In this respect, the embodiments of the phosphor wheel 5 and filter wheel 12 as shown in FIGS. 2a-6b and also their different phase relationships can also be used for the lighting device 100 shown in FIG. 10.

It goes without saying that the above-explained embodiments of phosphor wheel and filter wheel and also the respective phase relationships shown are merely exemplary in character and further modifications that nevertheless fall within the claimed scope of protection are furthermore conceivable.

The filter wheel can also be arranged directly upstream of the reflection side of the phosphor wheel. The filter wheel and the phosphor wheel can also be arranged on the same axis of rotation, provided that a control of the phase relationships between both wheels is possible. It is also possible to provide a plurality of filter wheels in a serial arrangement with separately adjustable phase relationships with respect to the phosphor wheel and/or with respect to the other filter wheels.

The invention claimed is:

1. A lighting device, comprising:
   a. a pump light source;
   b. a phosphor arrangement,
      i. wherein the phosphor arrangement has at least one phosphor element which can be irradiated with the pump light of the pump light source and re-emits said pump light at least partly in a wavelength-converted manner, and
      ii. wherein the phosphor arrangement is arranged in a moveable manner in a beam path of the pump light source;
   c. a filter arrangement,
      i. wherein the filter arrangement has at least one filter element which can be irradiated with the wavelength-converted light; and
      ii. wherein the filter arrangement is arranged in a moveable manner in a beam path of the wavelength-converted light;
   d. a movement unit which is configured to move the phosphor arrangement and the filter arrangement with a fixed phase relationship between the at least one phosphor element and the at least one filter element; and
   e. a phase control unit for controlling the phase relationship between the at least one moving phosphor element and the at least one moving filter element,
      wherein the moveable phosphor arrangement is a rotatable phosphor wheel and the moveable filter arrangement is a rotatable filter wheel, and
      wherein the phase control unit is adapted for changing the phase relationship between phosphor wheel and filter wheel.

2. The lighting device as claimed in claim 1, wherein the at least one filter element is a long-pass filter, short-pass filter, band-stop filter or bandpass filter.

3. The lighting device as claimed in claim 2, comprising one or a plurality of further filter elements configured as filter(s) from the group of filters mentioned in claim 2.

4. The lighting device as claimed in claim 1, wherein the filter arrangement has a transparency element, which is transparent to the pump light and the wavelength-converted light.

5. The lighting device as claimed in claim 1, wherein the at least one phosphor element and the at least one filter element are circle-sector-shaped or annular phosphor segment and filter segment, respectively.

6. The lighting device as claimed in claim 5, wherein the at least one filter segment occupies an angular range which is equal in magnitude to the angular range of the at least one phosphor segment.

7. The lighting device as claimed in claim 5, wherein the angular range of the at least one filter segment is smaller than the angular range of a further phosphor segment.

8. The lighting device as claimed in claim 1, wherein the pump light of the pump light source comprises blue laser radiation and/or blue-violet and/or ultraviolet laser radiation.

9. The lighting device as claimed in claim 1, wherein the phosphor arrangement comprises at least one phosphor which comprises a dominant wavelength in the green and/or red and/or yellow (Y) and/or blue (B) wavelength range.

10. A method for operating a lighting device as claimed in claim 1, with at least two different selectable operating modes for which the following holds true:
  a. operating mode A: setting a first phase relationship between the at least one moving phosphor element and the at least one filter element moving synchronously with the phosphor element with the aid of the phase control unit;
  b. operating mode B: setting a second phase relationship between the at least one moving phosphor element and the at least one filter element moving synchronously with the phosphor element with the aid of the phase control unit, wherein the second phase relationship differs from the first phase relationship.

11. The method as claimed in claim 10, wherein the first phase relationship corresponds to a first temporal overlap and the second phase relationship corresponds to a different or no temporal overlap between the at least one moving phosphor element and the at least one filter element moving synchronously with the phosphor element, and wherein the light emitted by the at least one phosphor element can pass through said filter element during the temporal overlap.

12. A projector comprising the lighting device as claimed in claim 1.

* * * * *